United States Patent [19]
Colosimo

[11] 3,821,575
[45] June 28, 1974

[54] COMMUTATORLESS AND BRUSHLESS DIRECT CURRENT MOTOR OR GENERATOR

[76] Inventor: Richard L. Colosimo, 1008 Ticonderoga Dr., Sunnyvale, Calif. 94087

[22] Filed: Jan. 17, 1973

[21] Appl. No.: 324,558

[52] U.S. Cl. ............................. 310/266, 310/179
[51] Int. Cl. ............................................. H02k 1/22
[58] Field of Search ....... 310/179, 67, 46, 156, 178, 310/177, 152, 49, 171, 261, 264, 266

[56] References Cited
UNITED STATES PATENTS

| | | | |
|---|---|---|---|
| 2,914,688 | 11/1959 | Matthews | 310/178 |
| 3,148,294 | 9/1964 | Jaeschke | 310/266 |
| 3,320,454 | 5/1967 | Kober | 310/156 |
| 3,471,728 | 10/1969 | Noble | 310/177 |
| 3,602,749 | 8/1971 | Esters | 310/266 |
| 3,610,974 | 10/1971 | Kenyon | 310/49 |
| 3,624,433 | 11/1971 | Jaeschke | 310/67 |

Primary Examiner—R. Skudy
Attorney, Agent, or Firm—Alfons Puishes

[57] ABSTRACT

An electrical generator utilizes a rotating magnetic field and a stationary wound stator to produce direct current output without the aid of a commutator or brushes. The continuous winding utilizes circumferential and radial slots in which the elements of the winding are alternately and successively placed so that only the radial slots generate a flow of current. The stator is arranged in segments, the connections between segments being magnetically shielded so as not to produce a flow of current and connected so that the flow would be additive and unidirectional. By supplying a direct current input the machine may be operated as a motor.

5 Claims, 6 Drawing Figures

PERMANENT MAGNET ROTOR

ELECTRO-MAGNETIC ROTOR

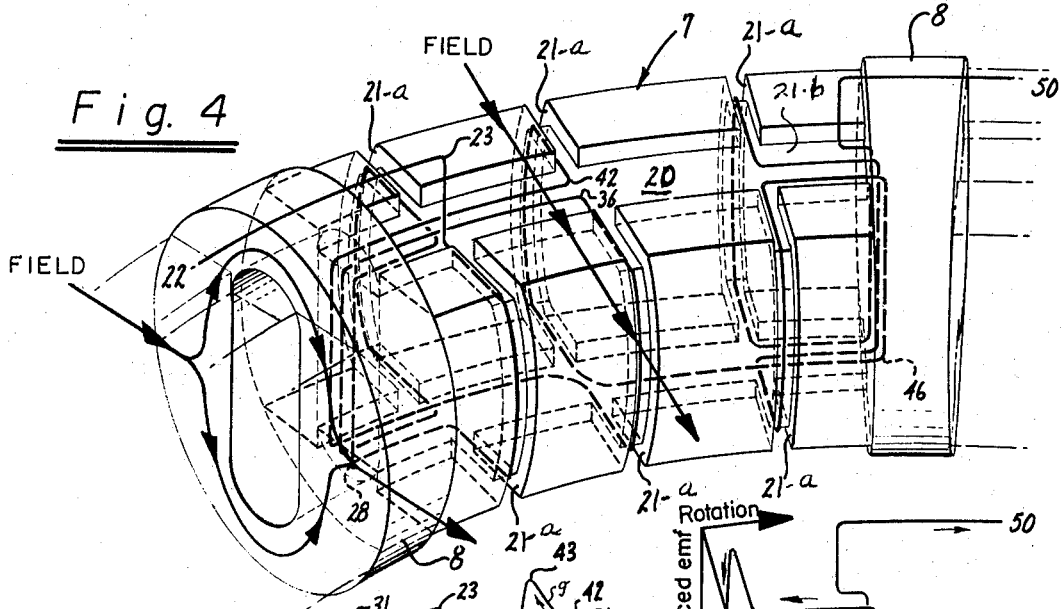
Fig. 4
Fig. 5
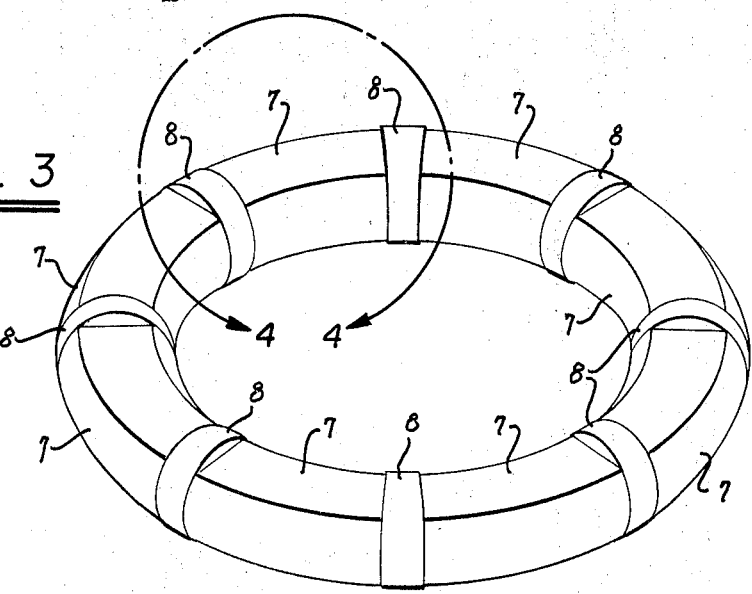
Fig. 3

COMMUTATORLESS AND BRUSHLESS DIRECT CURRENT MOTOR OR GENERATOR

BACKGROUND OF THE INVENTION

Conventional rotating machines for generating electricity normally produce alternating current. If direct current is desired the machines must be equipped with commutator-brush systems which are well known in the art.

The other alternative is to pass the alternating current through rectifiers which convert the alternating current to direct current. Many types and styles of the latter have been used in the past. They all involve considerable expense and a loss in overall efficiency.

In the case of commutator-brush systems, these are likewise cumbersome, are subject to high maintenance, loss of efficiency, noise, arcing, and limitation insofar as output potential is concerned. All of these problems are well known to those skilled in the art.

Since direct current is highly desirable and preferable to alternating current for many practical operations, many attempts have been made to produce direct current directly in a generator or utilize it in a motor without resorting to the above expedients. No devices or methods have been completely successful in solving these problems to date.

SUMMARY OF THE INVENTION

I have discovered that by utilizing a rotating magnetic field in combination with a stator having novel and unique windings together with suitable shields I am able to obtain a direct current output without using any commutators or brushes.

In general I utilize a rotor of generally cylindrical configuration which comprises a continuous, circular, bi-polar, U-shaped magnet which may be a permanent magnet or an electromagnet. Between the pole faces of my magnet which forms the U-shape I locate my stator which is of general toroidal or doughnut configuration.

My stator is divided into a plurality of separate sections separated from each other by magnetic shields. Each section is equipped with a plurality of slots adapted for receiving windings after the manner of conventional electrical machinery but so arranged and constructed as to permit the unique winding which comprises an important part of my invention.

The winding of my stator comprises a continuous coil in which those portions of the coil in which an electrical current may be induced, as they are cut through by the rotating magnetic field are so positioned on the stator that the induced current is always uni-directional and additive. Other portions of the coil which form conductive means for the current generating portions mentioned above are so positioned with regard to the rotating magnetic field that either no current is induced in them or if a counter electromotive force would be induced, they are shielded from the rotating magnetic field. Thus, the current output comes only from that part of my winding in which a uni-directional current is induced and hence a direct current output is obtained. This will be understood by those skilled in the art from the description which follows.

DESCRIPTION OF THE DRAWINGS

FIG. 3 is an isometric view showing the principal elements of my stator.

FIG. 4 is an isometric phantom view of a portion of the stator included in circle 4—4 of FIG. 3 showing the arrangement of my slots, coil winding and shields.

FIG. 5 is a diagrammatic view illustrating the method of winding my stator coil to produce uni-directional currents in its generating portions.

DESCRIPTION OF A PREFERRED EMBODIMENT

Figure 1:
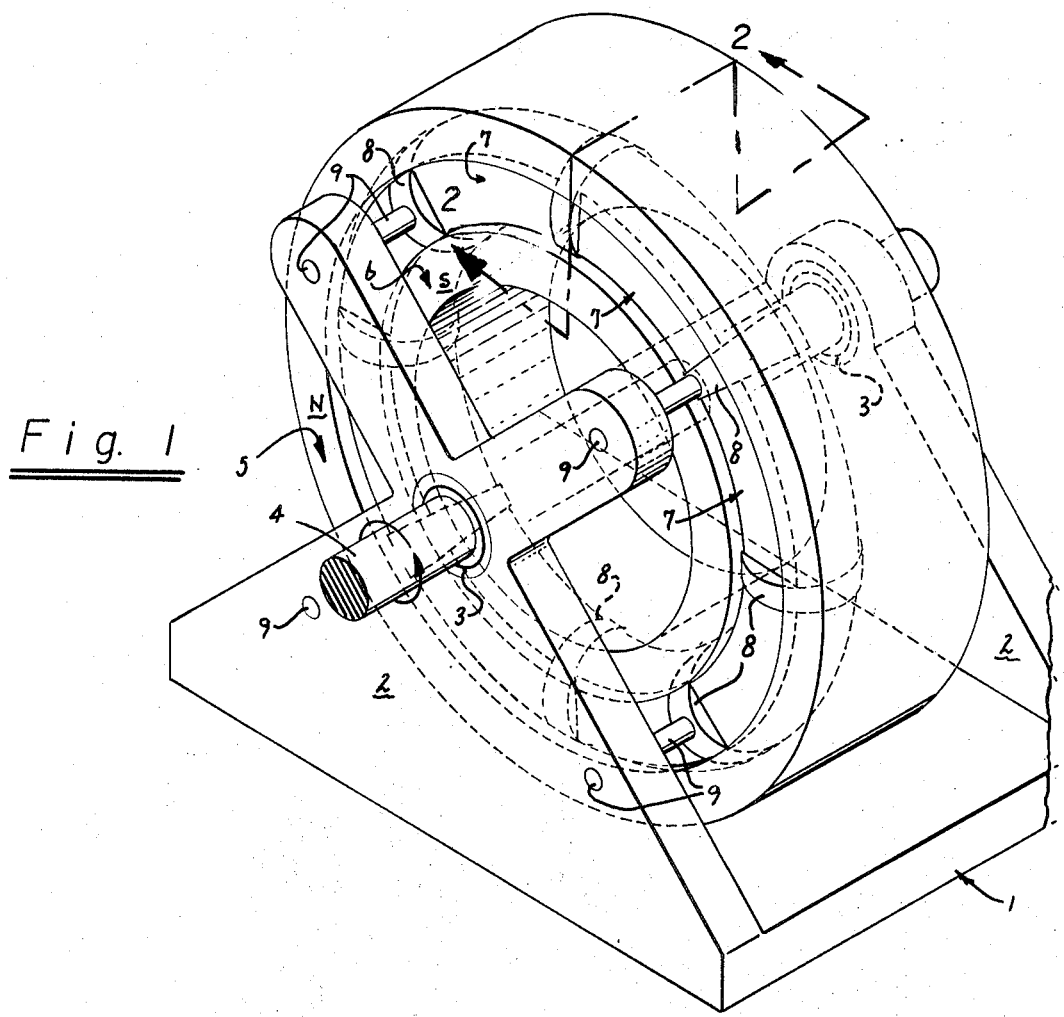
FIG. 1 is an isometric view showing a general arrangement of the principal parts of my invention.
Figure 2A:
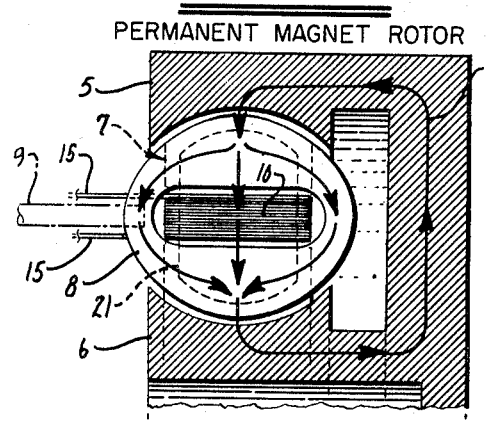
FIG. 2A is a section along lines 2—2 of an embodiment using a permanent magnetic rotating field.
Figure 2:
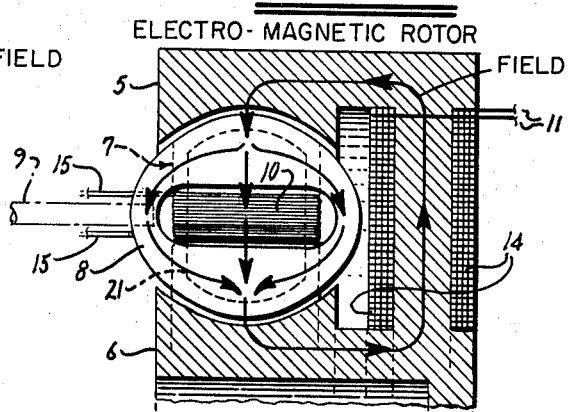
FIG. 2 is a section along lines 2—2 of an embodiment using an electromagnetic rotating field.

Referring now to the figures and particularly first to FIG. 1 and FIG. 2 and 2A there is seen the base 1 which supports end frames 2 in which are housed the bearings 3. These elements comprise the equivalent of the frame and endbells of a conventional motor or generator. Rotating shaft 4 rides in bearings 3 and carries the rotating field of my machine. The latter comprises an outer cylindrical pole piece 5 and an inner pole piece 6 which, of course, are of opposite magnetic polarity and are joined magnetically as well as mechanically as shown. This element of my machine is roughly analogous to a conventional horseshow magnet which has been bent into a C-shape so that the pole pieces are faced opposite to each other and form a gap between.

Stator core 7 is divided into segments by means of magnetic shields 8 and is supported on end frames 2 by means of pins 9. The shields are of generally elliptical shape with a symmetrically elliptical shaped hole through them, long and wide enough to accommodate the end conductors they must protect. The shields may be of soft iron or may be polarized if desired to enhance their shielding capability. Stator winding seen at 10 is described in greater detail below.

As stated above, I may employ either a permanent magnetic rotor or an electromagnetic rotor. When the latter is employed, I supply electric current to the field at 11. In this embodiment I employ field windings 14. This embodiment, of course, is not strictly "brushless" since brushes and slip rings are required to supply the field current. It is, however, commutatorless in every respect. The output terminals are seen at 15 and their relation to the rest of the winding will be evident from the remainder of the description which follows.

Referring now more particularly to FIG. 4 and FIG. 5 there is seen first a portion of my toroidal or doughnut shaped stator core 20 carrying slots 21b, and cross slots 21a. Shields 8 are shown at opposite ends of the segment of stator 20.

In the description of the winding of my stator coil which follows, I have indicated portions of the winding by a series of successive numbers from 22 to 46 as best seen on FIG. 5. Those portions of my winding in which no electrical current is induced, I have designated by the letter "n." Those portions in which current is induced, I have designated by the letter "g." Those portions in which current may be induced but would be undesirable because of its direction and which is consequently protected by shields 8, I have designated by the letter "s."

Starting now at 22 which represents a portion of the coil, as well as an input to the segment of the stator shown from the adjoining segment, I go through point 23 to point 24 and this portion represents a non-generating portion as shown by the letter "n." From point 24 I go through point 25 and 26 to 27 since it is evident that this portion of my winding is cut through by the rotating magnetic field, it will generate a current as designated by "g." From 27 to 28 I go through another non-generating portion "n," as this conductor is parallel to the rotating magnetic field. The portion from 28 to 29 would normally be a generating portion in which the induced current would be in the opposite and undesirable direction were it not for the action of the shield 8. Consequently, this section designated as "s," likewise becomes a non-generating portion. The portion from 29 to 30 is likewise non-generating after the manner of portion 27 to 28 mentioned above. The portion from 30 to 31 through 32 to 33 is a generating portion, and a current is induced in it as in the previous portions marked "g," and the direction is additive to the previously generating portion as shown. Portion 33 to 34 is non-generating after the manner of 27 to 28 and portion 34 to 35 is shield. The remainder of the winding of this portion of my coil may now be traced out in a similar manner with the portions marked "g" and those corresponding being additive and uni-directional, resulting in a cumulative direct current output shown at 50. The individual segments of my winding are thus joined together and the output terminals which would correspond to the ultimate ends of points 22 and 50, are shown at 15 on FIG. 2 and FIG. 2a.

OPERATION

The operation of my invention to produce direct current or to operate as a motor if direct current is supplied to the terminals 15, should now become evident to those skilled in the art.

For a better understanding, reference should be had to the vector diagram superimposed on the coil wiring diagram FIG. 5. This represents an application of Fleming's well known righthand rule of electromagnetic induction. The thumb points in the direction of the relative rotation of the conductor (the movement of the field in the opposite direction), the forefinger points North to South direction of the field, and the resultant direction of the induced electromotive force is indicated by the middle finger.

Likewise Fleming's left-hand motor rule can be applied to my machine when operated as a motor.

As the magnetic field rotates, the portions of the stator winding which comprise semi-circular segments on opposite sides of the stator at right angles to the field are simultaneously cut by the magnetic flux and a current or electromagnetic force is generated in the same direction in all exposed conductors. As shown, these coils are wound continuously so that all the generating electromotive forces or induced currents are additive.

The partially exposed crossover conductors on the top and bottom of the stator are parallel to the field and thus no current is generated in the conductors.

The end conductors described above are perpendicular to the field and would normally be cut through by the rotating field and produce a counter-electromotive force, but are protected by a magnetic shield as shown which directs the path of the magnetic flux around that portion of the coil or conductor. As the rotating magnetic field is directed to the periphery of the shield, the field collapses in a manner such that it runs parallel to the end conductors precluding any induction of counter-electromotive force.

The net result will be that a direct current is produced by the machine when operating as a generator as described above, or it may operate as a motor if direct current is supplied to the output terminal, also as mentioned above.

It should also now be evident to those skilled in the art that with my invention I am able to overcome the problems encountered with machines employing commutators and brushes described above and am able to produce direct current simply, cheaply, and efficiently without the use of a great deal of expensive auxiliary material or equipment.

I claim:

1. An electrical machine comprising:
    a rotor comprising north and south magnetic poles in spaced relation to each other and defining a magnetic field therebetween;
    a stator positioned between said poles in spaced relation therewith and within said magnetic field;
    said stator being characterized by a plurality of separate segments, said segments being separated from each other by magnetic shields;
    a continuous electrical winding positioned upon said stator and forming a part thereof;
    said winding being further positioned within a plurality of slots forming a part of each of said segments;

said slots comprising a first set of slots positioned circumferentially around said stator and a second set of slots positioned radially around said stator;
    said continuous winding being so further positioned within said slots that successive portions thereof are alternately positioned in said circumferential slots and in said radial slots within each of said segments of said stator;
    means for connecting successive portions of said winding in said segments of said stator with each other;
    said connecting means being positioned within said magnetic shields;
    whereby a unidirectional flow of electric current is generated in said winding when said rotor is rotated relative to said stator; means for conducting said current from said winding.

2. The machine of claim 1 in which said magnetic poles comprise electromagnets having coil windings positioned thereon; means for supplying direct current to said windings.

3. The machine of claim 1 in which:
    said rotor has the general configuration comprising two hollow concentric cylinders positioned one inside the other;
    one end of said cylinders being closed to form a cup;
    the other end of said cylinders being open to form a gap therebetween;
    said stator is of generally toroidal configuration;
    said stator being positioned radially concentric with said cylinders and within said gap formed thereby.

4. The machine of claim 1 including means for supplying direct current to said stator winding whereby said rotor is made to rotate and thereby generate mechanical power.

5. An electrical machine comprising:
a rotor comprising north and south magnetic poles in spaced relation to each other and defining a magnetic field therebetween;
a stator positioned between said poles in spaced relation therewith and within said magnetic field;
a core of generally toroidal configuration and comprising a plurality of independent segments, each of said segments being separated from the adjacent segments by a magnetic shield interposed therebetween;
each of said segments being further characterized by a circumferential slot running concentrically with respect to said toroidal core and a plurality of cross slots running radially with respect to said core and around the body thereof;
a continuous electrical winding positioned upon said segments and within said slot;
said winding being further so positioned on said segments that successive elements thereof lie alternately in said circumferential slot and in said cross slots;
means for connecting successive portions of said winding in said segments with each other;
said connecting means being positioned within said magnetic shields,
whereby a unidirectional flow of electric current is generated in said winding under the action of said rotating field; means for conducting said current from said winding.

* * * * *